(12) United States Patent
Hall

(10) Patent No.: US 10,399,002 B2
(45) Date of Patent: Sep. 3, 2019

(54) INTERNAL TANK DISENGAGING SYSTEM

(71) Applicant: CONOCOPHILLIPS COMPANY, Houston, TX (US)

(72) Inventor: Jeffrey A. Hall, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 15/727,753

(22) Filed: Oct. 9, 2017

(65) Prior Publication Data

US 2018/0104616 A1    Apr. 19, 2018

Related U.S. Application Data

(60) Provisional application No. 62/409,470, filed on Oct. 18, 2016.

(51) Int. Cl.
*B01D 1/20* (2006.01)
*B01D 1/06* (2006.01)
*C10G 7/00* (2006.01)
*B01D 3/00* (2006.01)

(52) U.S. Cl.
CPC ............... *B01D 1/20* (2013.01); *B01D 1/06* (2013.01); *B01D 3/007* (2013.01); *C10G 7/00* (2013.01)

(58) Field of Classification Search
CPC .................................... B01D 1/06; B01D 1/20
See application file for complete search history.

(56) References Cited

U.S. PATENT DOCUMENTS

| 2,117,548 A | 5/1938 | Drennan |
| 3,388,046 A | 6/1968 | Hendrix |
| 5,344,631 A * | 9/1994 | Bruggendick ......... B01D 53/08 423/210 |
| 2012/0167617 A1 | 7/2012 | Anghel et al. |

FOREIGN PATENT DOCUMENTS

WO    2016029046 A1    2/2016

OTHER PUBLICATIONS

International Search Report—PCT/US2017/055715 dated Jan. 4, 2018; 2 pgs.

* cited by examiner

*Primary Examiner* — Randy Boyer
(74) *Attorney, Agent, or Firm* — Conocophillips Company

(57) ABSTRACT

A method for separating lighter components of a hydrocarbon product in a container tank includes introducing the hydrocarbon product into the container tank via an inlet located near or at the bottom of the container tank; routing the hydrocarbon product through a pipe-in-pipe conduit that is at least partially surrounded by a bulk fluid stored in the container tank; providing a vapor-liquid interface that allows efficient evaporation of the lighter components resulting in separation of the lighter components and a processed hydrocarbon product; and routing the processed hydrocarbon product into the annular space of the pipe-in-pipe conduit thereby thermally insulating incoming hydrocarbon product from the surrounding bulk fluid and eliminating or minimizing vapor liquid equilibrium shift of the incoming hydrocarbon product caused by increased head pressure and/or reduction in temperature of the incoming hydrocarbon product.

6 Claims, 2 Drawing Sheets

INTERNAL TANK DISENGAGING SYSTEM

PRIORITY CLAIM

This application is a non-provisional application which claims benefit under 35 USC § 119(e) to U.S. Provisional Application Ser. No. 62/409,470 filed Oct. 18, 2016, entitled "INTERNAL TANK DISENGAGING SYSTEM," which is incorporated herein in its entirety.

FIELD OF THE INVENTION

The present invention relates generally to crude oil conditioning. More particularly, but not by way of limitation, embodiments of the present invention include removing or limiting amount of volatile hydrocarbons in crude oil by utilizing an internal tank separator apparatus that retains enthalpy to enhance flash vaporization removal of lighter ends.

BACKGROUND OF THE INVENTION

While storing and transporting crude oils is generally safe, several high-profile accidents have led to calls for greater safety standards. For example, the North Dakota Industrial Commission recently issued new conditioning standards requiring all crude oil produced in the Bakken region to be conditioned to remove lighter, volatile hydrocarbons in order to make oil safer during railroad transport. In particular, the new standard established operating standards for oil conditioning equipment with a goal of limiting the Reid vapor pressure to no greater than 13.7 pounds per square inch (psi).

Unfortunately, crude from the Bakken region can have a high gas-to-oil ratio which makes complying with existing conditioning equipment difficult. This problem is especially exacerbated during colder winter months. Traditional options to limit vapor pressure includes costly equipment such as stripper column or absorber/stripper columns. Other options such as routing the crude to a common stabilizer can add pipeline and right of way costs.

BRIEF SUMMARY OF THE DISCLOSURE

The present invention relates generally to crude oil conditioning. More particularly, but not by way of limitation, embodiments of the present invention include removing or limiting amount of volatile hydrocarbons in crude oil by utilizing an internal tank separator apparatus that retains enthalpy to enhance flash vaporization removal of lighter ends.

An embodiment of the present invention includes a method for separating lighter components of a hydrocarbon product in a container tank, comprising: a) introducing the hydrocarbon product into the container tank via an inlet located near or at the bottom of the container tank; b) routing the hydrocarbon product through a pipe-in-pipe conduit that is at least partially surrounded by a bulk fluid stored in the container tank; c) providing a vapor-liquid interface that allows efficient evaporation of the lighter components resulting in separation of the lighter components and a processed hydrocarbon product; and d) routing the processed hydrocarbon product into the annular space of the pipe-in-pipe conduit thereby thermally insulating incoming hydrocarbon product from the surrounding bulk fluid and eliminating or minimizing vapor liquid equilibrium shift of the incoming hydrocarbon product caused by increased head pressure and/or reduction in temperature of the incoming hydrocarbon product.

Another embodiment of the present invention includes an apparatus for separating lighter components of a hydrocarbon product in a container tank comprising: a) an inner pipe disposed in an outer pipe, wherein the inner pipe and the outer pipe extend vertically within the container tank and the inner pipe provides a passageway through which the hydrocarbon product is routed upwards to the vapor space of the container tank; b) an inlet located at or near the bottom of the apparatus, wherein the inlet is fluidly connected to the inner pipe and is configured to receive incoming hydrocarbon product; c) a distribution screen located near or top of the apparatus, wherein the distribution screen provides an interface for single stage flash evaporation upon spray, impingement and/or agitation of the hydrocarbon product thereby resulting in a processed hydrocarbon product; d) a secondary area for vapor-liquid separation located below the distribution screen in the annular space between the inner and outer pipes, wherein the secondary area includes a packed bed that provides additional separation of components of the hydrocarbon product; e) an annular downward flow path for the processed hydrocarbon product, which provides a barrier against heat transfer between incoming hydrocarbon product in the inner pipe and bulk surrounding fluid stored in the container tank.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Figure 1:
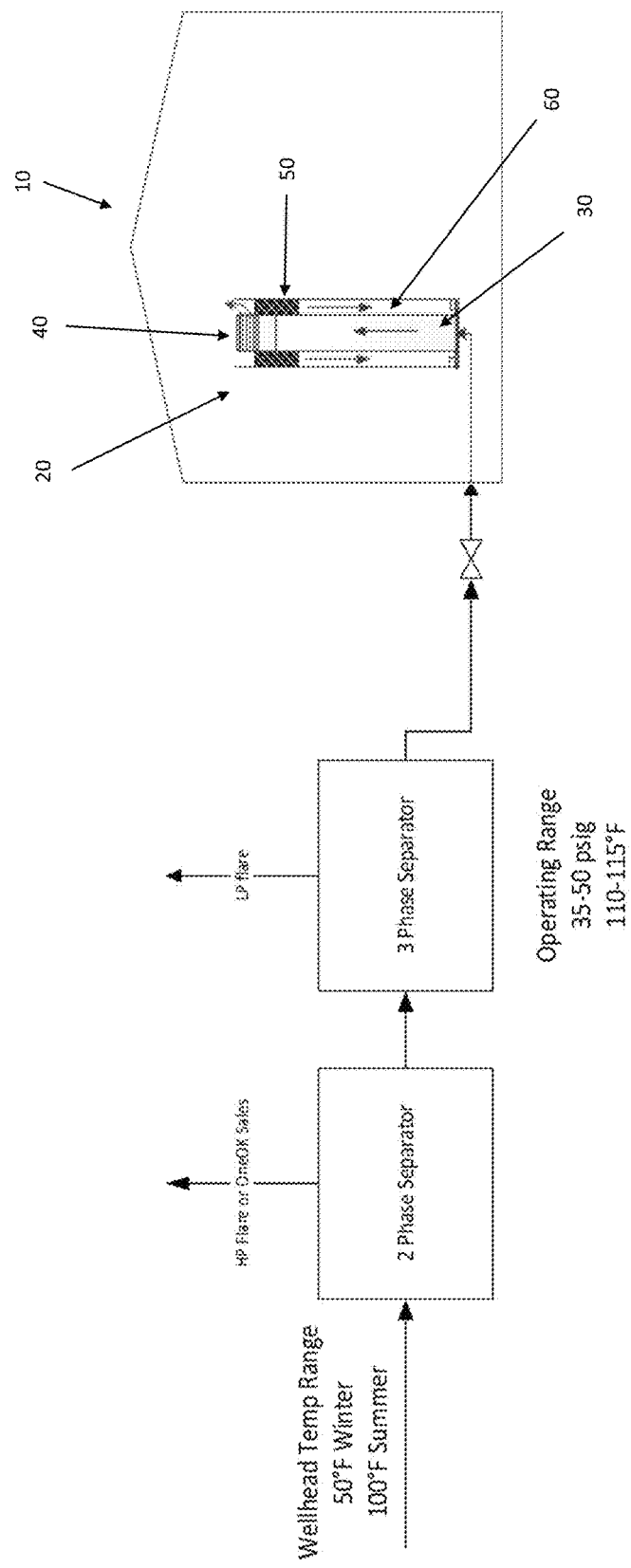
FIG. 1 is a simplified diagram illustrating a crude oil storage facility.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

The present invention provides systems and methods for conditioning crude oil in order to achieve lower Reid vapor pressure in an oil field tank. This is accomplished by equipping the oil field tank with an internal tank separator apparatus that directs flow of various hydrocarbon products inside the tank and also utilizes one of the products, warm conditioned hydrocarbon product(s), as a thermal insulator for incoming crude oil. As a result, the incoming crude oil retains higher enthalpy content which, in turn, facilitates evaporation of lighter ends (e.g., methane, ethane, butane, propane, isobutane, etc.).

As used herein, the term "crude oil" refers to unrefined petroleum product composed of hydrocarbons and other organic materials. Crude oil can be refined to produce usable products such as gasoline, diesel and various forms of petrochemicals. As used herein, the term "conditioning" refers to processing crude oil in order to separate the crude oil into oil, gas, and/or water. In general, conditioning crude oil is performed before refining steps. Reid vapor pressure is a common measure of volatility of hydrocarbon products. It is usually defined as the absolute vapor pressure exerted by a liquid at 100° F. (37.8° C.) as determined by a test method ASTM-D-323 entitled "Standard Test Method for Vapor Pressure of Petroleum Products (Reid Method) that is publically available from ASTM International. However, the Environmental Protection Agency has granted the use ASTM D6377 Vapor Pressure of Crude Oil (VPCRx [Expansion Method]) as an alternate method for measuring vapor pressure (VP) of high vapor pressure "live" crude. Although D323 RVP and D6377 VP are not identical methods, they may thought of generically as methods of measuring vapor pressure for the purpose of this patent application.

There are at least several significant advantages of the internal tank separator over conventional approaches to limiting vapor pressure. First, the cost of the apparatus is comparatively low since the design is relatively simple and does not feature any moving parts. Second, the apparatus works to limit the Reid vapor pressure regardless of the liquid level inside the oil tank. Even the highest vapor pressure oil can readily degas to the desired specification.

As would be expected, temperature of the crude oil is typically highest during the summer months and lowest during winter months. The difference between peak and base temperatures can be up to or even greater than 50° F. (~28° C.). Normally, this makes removing lighter ends (and limiting Reid vapor pressure to conforming levels) a tougher challenge during the colder months. The present invention can achieve lower vapor pressures year round. The conforming lower vapor pressures can be achieved at much lower costs compared to conventional methods that typically employ expensive combinations of vessels, heaters, and/or pumps. Other advantages of the present invention will be evident from the disclosure herein.

FIG. 1 shows a schematic illustration of a crude oil storage facility equipped with the internal tank separator 20 of the present invention. The facility includes a two-phase separator and a three-phase separator that process crude oil before it reaches the oil field tank 10. The separators can be conventionally available separators that separate the crude oil into gas and oil or gas, oil, and water. As shown, the internal tank separator 20 of the present invention is installed in the oil field tank 10.

In one embodiment in accordance with the present invention, crude oil enters the oil field tank at or near the bottom of the tank and is routed to the vapor space at or near top of the tank. Referring to FIG. 1, the internal tank separator 20 is configured to receive incoming crude oil at or near the bottom of the apparatus. This configuration minimizes static buildup that can accumulate if the incoming crude oil is introduced from a higher elevation. In this specific example, the incoming crude oil has been processed through both a two-phase and a three-phase separator. This configuration is not intended to be limiting. The present invention should function as intended as long as the incoming crude oil has sufficient enthalpy (i.e., to vaporize lighter ends to a desired level when it reaches the oil tank vapor space). The exact location and/or elevation of the inlet may vary depending on a number of factors including, but not limited to, temperature, dimensions and geometry of the oil field tank, dimensions and geometry of the internal tank separator, and the like.

Once the crude oil is introduced into the internal tank separator 20, it is routed through an inner pipe 30 to a distribution screen 40 that is installed near or at top of the internal tank separator 20 above the liquid level (vapor space) of the oil field tank 10. The distribution screen 40 can be any structure which facilitates evaporation (e.g., single stage flash evaporation) of the crude oil. Ideally, the evaporation results in vaporized lighter ends and thermally warm (compared to bulk fluid in the tank) non-vaporized hydrocarbon product. The distribution screen 30 may be a perforated plate, slotted screen, micro-fabricated pillars, or similar structure.

While the vaporized lighter ends may be flared, vented, compressed to sales pressure, or otherwise released or utilized to reduce the Reid vapor pressure, the non-vaporized portion of the crude oil ("warm conditioned hydrocarbon product") is routed to a secondary separation bed 50 located just below the distribution screen 40. The separation bed 50 is disposed within the annular space between the inner pipe 30 and the outer pipe 60. This non-vaporized hydrocarbon product will be typically warmer than the stored bulk oil liquid that surrounds the internal tank separator. Thus, the non-vaporized hydrocarbon product flows down the annular space serving as a thermal insulator that allows incoming crude oil to retain much of its enthalpy before the hydrocarbon product exits through openings at the base of the internal tank separator. Because of its higher enthalpy content, the incoming crude oil readily vaporizes once it gets downstream to the distribution screen 40. In some embodiments, the crude oil may be sprayed and/or agitated, or flowed through trays, and/or packed above the liquid level of the container tank and onto the distribution screen which can enhance the evaporation process.

In certain colder weather areas, heat trace and insulation of rundown line may be needed or desirable to minimize heat loss to the environment during the winter months. Heat input requirements will not typically exceed what is necessary to offset heat loss to the environment. In warmer climates, insulation without heat trace may be sufficient.

Figure 2:
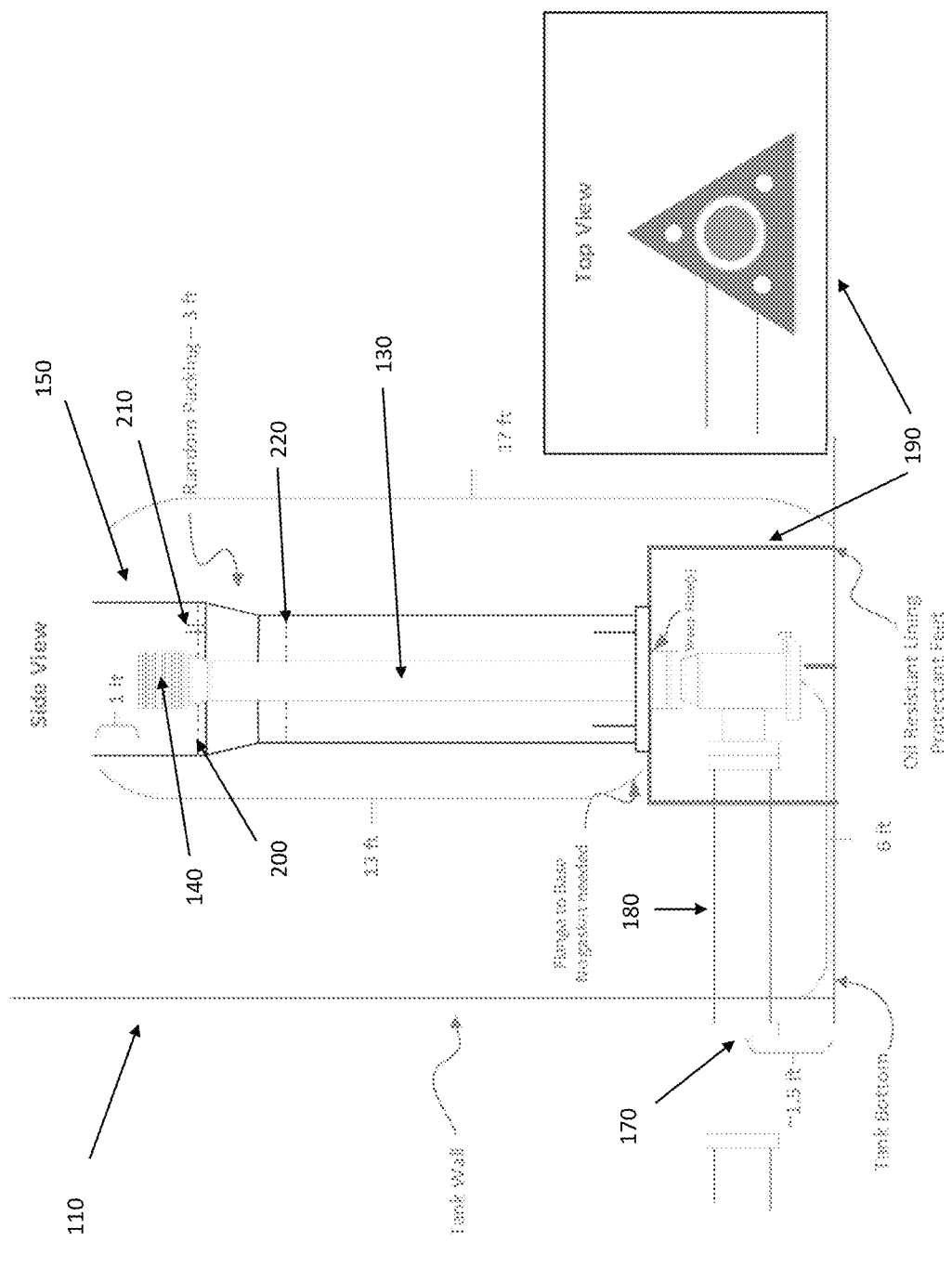
FIG. 2 is a close-up view of an internal tank separator.

FIG. 2 illustrates a closer view of the internal tank separator apparatus 150 installed in an oil tank 110 according to an embodiment of the present invention. While certain dimensions of the embodiment are shown in FIG. 2, this is illustrative and not intended to be limiting. Referring to FIG. 2, entry point to the oil tank may utilize a standard inlet nozzle 170 on the oil tank (typically API 12F) or may be retrofitted via a nozzle on a new split manway configuration. The piping section 180 may be of any suitable size or material. A support 190 can be used to properly install the internal tank separator 150 on the tank bottom. In some embodiments, a support of three or more adjustable legs with swivel type feet can be used to install the internal tank separator on flat or non-flat (e.g. cone) bottom tanks.

Use of lighter-weight materials (e.g., aluminum, fiberglass, etc.) above the stand 190 facilitates construction and lowers amount of torque on the flange at the base. The distributor 140 at the top of the inner pipe 130 disperses the oil circumferentially in a horizontal spray pattern (due to the solid cap on the top of the distributor). The distributor holes or slots, should be sized to accommodate the range of flow rates expected during the operation. The dispersed oil from the distributor 140 collects on the distribution tray (200) above the packing where the oil is distributed onto the packing via openings in the tray. The tray may contain one or more overflow tubes or weirs (210), which allow excessive liquid buildup to easily exit the distribution tray before the level reaches the upper distribution screen. In normal operation, the overflow tubes or weirs, serve as a flow path for the vapor released in the packed section. The packed section may be random or structured packing of suitable material (plastic, steel, aluminum, etc.). A bottom support tray (220) located approximately 2-5 feet below the distribution tray, supports the packing, while allowing the oil to flow through the support tray openings where the oil level in the annular space of the device, equilibrates with the bulk tank level based on communication through the holes or slots at the base of the device.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. An apparatus for separating lighter components of a hydrocarbon product in a container tank comprising:
    a) an inner pipe disposed in an outer pipe, wherein the inner pipe and the outer pipe extend vertically within the container tank and the inner pipe provides a passageway through which the hydrocarbon product is routed upwards to the vapor space of the container tank;
    b) an inlet located at or near the bottom of the apparatus, wherein the inlet is fluidly connected to the inner pipe and is configured to receive incoming hydrocarbon product;
    c) a distribution screen located near or top of the apparatus, wherein the distribution screen provides an interface for single stage flash evaporation upon spray, impingement and/or agitation of the hydrocarbon product thereby resulting in a processed hydrocarbon product;
    d) a secondary area for vapor-liquid separation located below the distribution screen in the annular space between the inner and outer pipes, wherein the secondary area includes a packed bed that provides additional separation of components of the hydrocarbon product;
    e) an annular downward flow path for the processed hydrocarbon product, which provides a barrier against heat transfer between incoming hydrocarbon product in the inner pipe and bulk surrounding fluid stored in the container tank.

2. The apparatus of claim 1, wherein the ratio of inner pipe inner diameter to outer pipe inner diameter is between about 1:1.5 to about 1:10.

3. The apparatus of claim 1, wherein the inlet is configured to receive incoming hydrocarbon product from outside of the container tank.

4. The apparatus of claim 1, wherein the distribution screen is slotted or perforated.

5. The apparatus of claim 1, wherein the outer diameter of the inner pipe and/or inner diameter of the outer pipe is coated with insulation material.

6. The apparatus of claim 1, wherein the distribution screen made from a material selected from the group consisting of: metal, fiberglass, or any material insoluble in hydrocarbon.

\* \* \* \* \*